United States Patent [19]

Smith

[11] 4,141,174

[45] Feb. 27, 1979

[54] QUANTITATIVE APPARATUS FOR SAMPLING ATHROPODS ASSOCIATED WITH FIELD CROPS

[75] Inventor: James W. Smith, Leland, Mich.

[73] Assignee: The United States of America as represented by the Secretary of Agriculture, Washington, D.C.

[21] Appl. No.: 801,273

[22] Filed: May 27, 1977

[51] Int. Cl.² ............................................. A01M 1/06
[52] U.S. Cl. ........................................................ 43/139
[58] Field of Search ................... 43/58, 62, 139, 133; 23/259, 292; 128/1

[56] References Cited

U.S. PATENT DOCUMENTS

| 1,047,164 | 12/1912 | Butenschoen | 43/139 X |
| 2,786,740 | 3/1957 | Taylor et al. | 23/259 X |
| 3,750,327 | 8/1973 | Thybault | 43/139 |

Primary Examiner—Robert C. Watson
Attorney, Agent, or Firm—M. Howard Silverstein; Salvador J. Cangemi; David G. McConnell

[57] ABSTRACT

An apparatus for sampling insect populations in an agricultural crop environment is disclosed. The apparatus comprises a chamber to entrap insects thus allowing collecting said insects through the use of a vacuum by an operator and collecting said insects in a filter type bag from which the insects can be classified and counted.

1 Claim, 3 Drawing Figures

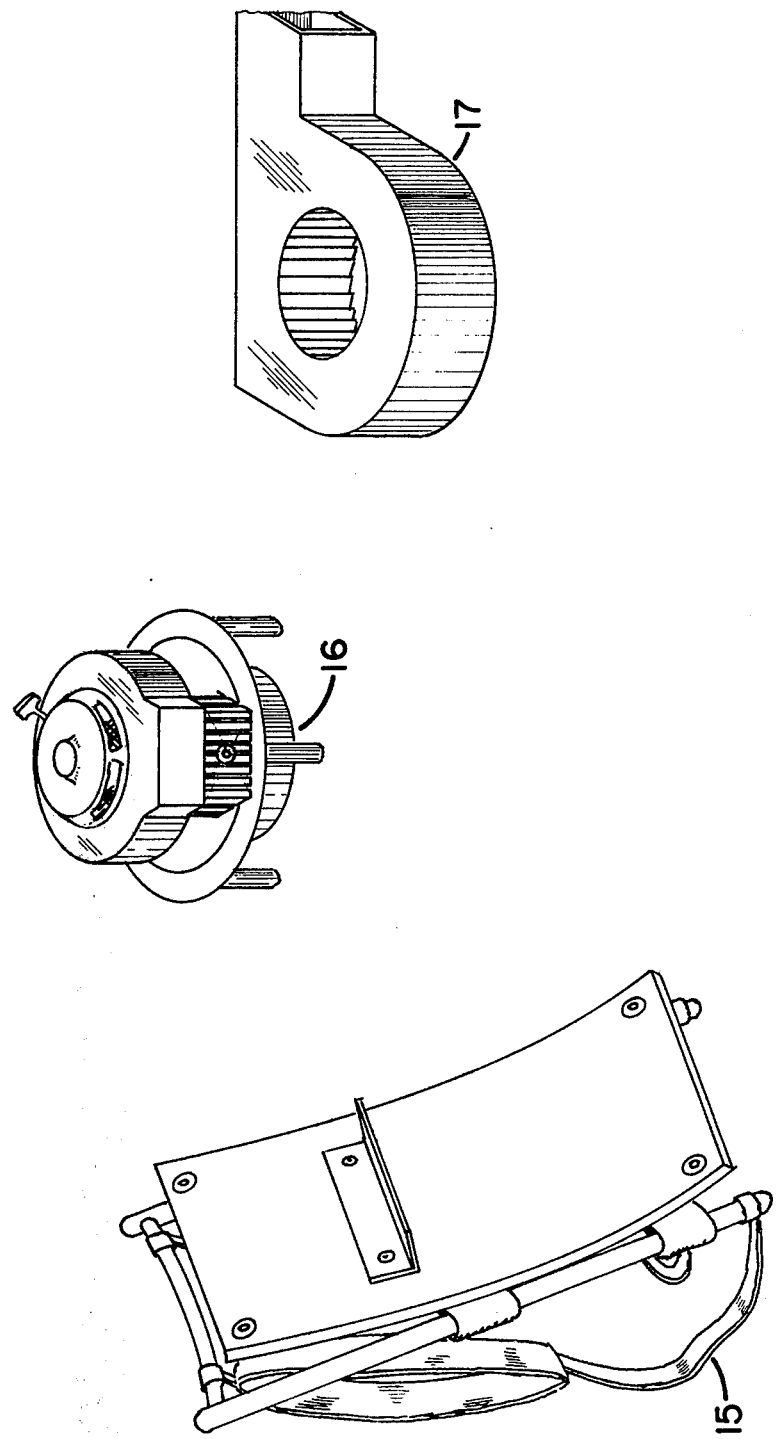

QUANTITATIVE APPARATUS FOR SAMPLING ATHROPODS ASSOCIATED WITH FIELD CROPS

BACKGROUND OF THE INVENTION

1. Field of the Invention

This invention relates to an apparatus for entrapping insects relative to population studies for agricultural crops.

2. Description of the Prior Art

Sampling habitats to determine the distribution and abundance of arthropods is a preliminary phase of any basic or applied work on insect-plant interactions. Data collecting for research purposes requires precise estimates of parameter values.

Measurements taken to estimate population density fall into these groups: absolute methods, relative methods, and population indices. Population indices do not count insects at all, but rather they are a measure of insect products or effects.

Absolute methods yield estimates as density per unit of land area in the habitat. Absolute methods provide data of the type most often desired by population ecologists. Successive estimates of the number of insects per unit of land area are necessary for constructing life tables and for nearly all other studies of population dynamics of uncaged field populations. Unfortunately most methods used by entomologists are relative methods which yield density per unit other than land area and cannot be converted to absolute estimates without a major effort to correct for the insect's behavior and/or the effect of habitat. Insect nets and vacuum sweeping devices are examples of relative methods.

For many years researchers have attempted absolute samples by whole plant examinations. Whole-plant examination in the field required no special equipment. The plants within a given area are simply examined in situ. Examination for insects usually started at the lower branches and systematically progressed to the terminal growth at the top. The disadvantages in this technique are many. First many insects escape detection by moving out of the area or hiding. Identification of species is difficult without magnification which is not practical in most field situations. Record keeping is extremely difficult during whole plant examinations and mistakes are impossible to correct.

Gonzales et al. (*Journal of Economic Entomology*, Vol. 63, No. 5, pp. 1704–1706, 1970) reported on a "clam shell" device for estimating absolute insect populations on cotton. This method solved several problems associated with obtaining absolute samples. It prevented the escape of insects and allowed counting and identification in the laboratory, but this method requires the removal of plants from the study area which is not desirable in most research situations. Another disadvantage of this approach lies largely in the processing of the sample. Arthropods must be separated from the plant material which is very time consuming.

The lack of quantitation of almost all past work involving field populations of beneficial arthropods in cotton renders most of these data unsuitable for use with mathematical computer models used in pest management.

SUMMARY AND OBJECTS OF THE INVENTION

In the present invention, a cage is used to trap the arthropods on a plant. The arthropod-entrapment cage is bottomless to permit it to be placed over and completely around a plant specimen in an agricultural environment to entrap all arthropods on, and in the immediate vicinity of, the plant. In operation, the ground forms the bottom boundary of the cage.

A vacuum hose is connected to the cage to withdraw all arthropods therefrom and capture them in a filter bag at the other end of the hose.

To enhance removal of the arthropods from the cage, the sides and top of the cage may be transparent; the hose may extend into the cage a sufficient distance to reach all points on the cage's inner sides, top and bottom; and the sides of the cage may include openings for the insertion of the operator's arms and hands to permit manipulation of the hose nozzle so as to withdraw arthropods which may cling to the inner sides, top or bottom of the cage.

It is the primary object of the invention to obtain quantitative population data on natural field arthropods for establishing the efficiency of common sampling techniques.

It is another objective of the invention to supply very accurate population data where detailed knowledge of the environment is necessary.

It is another object of the invention to prevent the arthropods from neighboring area moving into the sample area during the sampling operation.

It is another object of the invention to separate the arthropods from plant soil.

It is another object of the invention to place arthropods in a container for transport or storage for subsequent classification and counting.

It is another object of the invention to provide a light portable apparatus which is easily transportable to the field cite thus allowing many samples to be taken within a work period and requiring no more than two people for operation.

Other objects and advantages of the instant invention will become obvious from the detailed description of the drawings and the description of preferred embodiments of the invention.

BRIEF DESCRIPTION OF THE DRAWINGS

FIG. 3 is an exploded view of element 1 in FIG. 1.

DESCRIPTION OF THE PREFERRED EMBODIMENTS OF THE INVENTION

Figure 1:
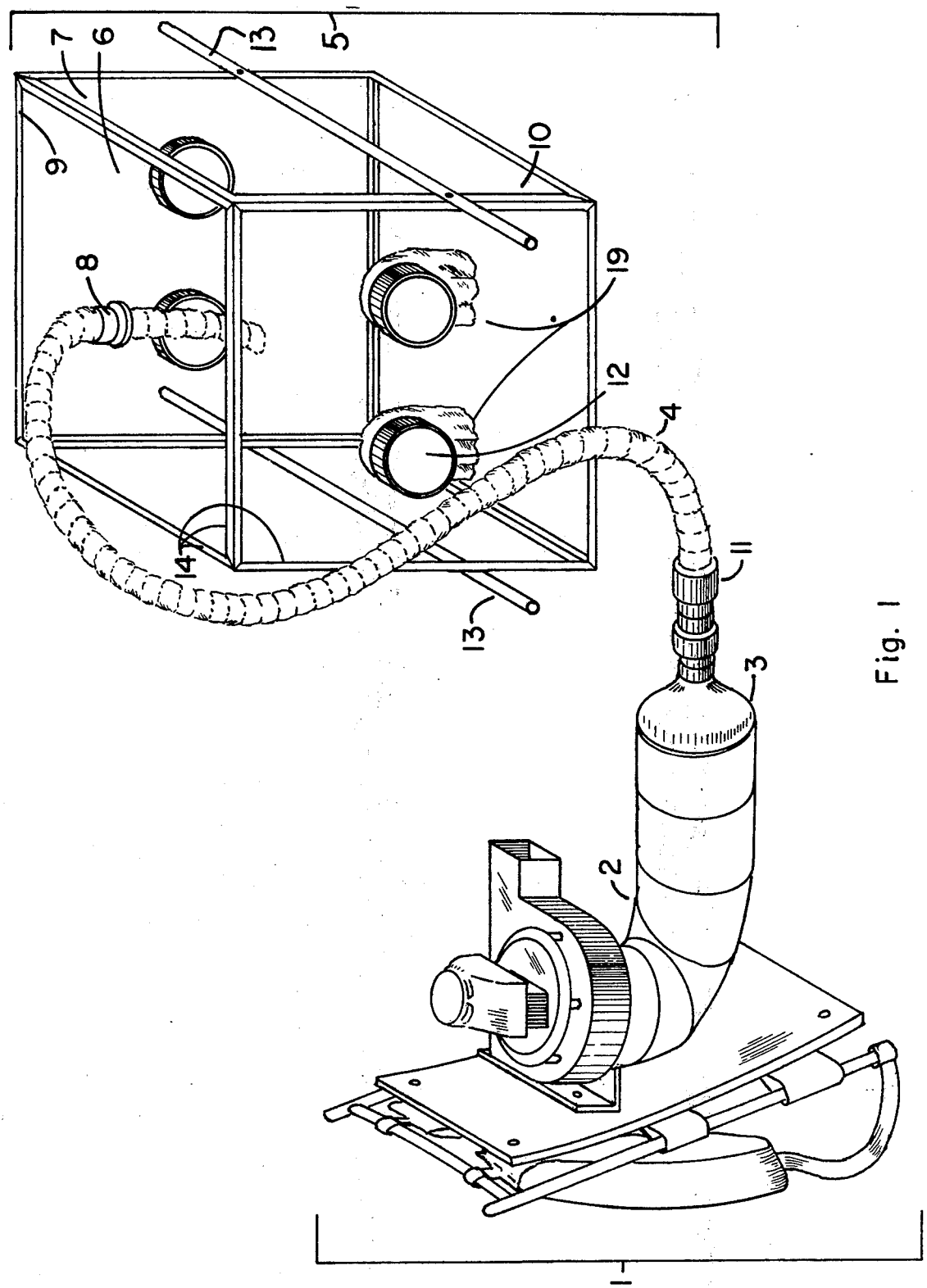
FIG. 1 is a perspective view of the overall apparatus of the present invention.

Referring now to FIG. 1 wherein collecting cage 5 is connected to protable air suction machine 1 thus forming an area sampler which utilizes a vacuum for collecting insects in a field of agricultural crops. Collection cage 5 is a monocock structure and is constructed of angle type ribs 14 forming a cubic or rectangular type configuration. Ribs 14 may be of any rigid material which is sufficient to support the structure. In the instant invention, $\frac{1}{8}'' \times 1'' \times 1''$ aluminum angle material was used. Transparent sides 7 and top 6 are appropriately affixed to ribs 14 thus forming a rigid transparent structure with an open bottom 10. Plexiglass was used in the instant invention although any transparent material would suffice. The open bottom 10 is for purposes of inserting plant materials which are to be sampled. Population insect studies are made in situ in agricultural crop locations and hence necessitated the instant design.

Due to its light weight the sampling apparatus is very portable and is carried to the sampling site in the field usually by two people using handles 13. Once the sampling site is chosen, collecting cage 5 is quickly placed over the plants to be sampled. All arthropods within the cage are thus entrapped and can be collected for counting and classifying. Due to their natural instincts, most of the insects will attempt to leave the immediate area. Immature forms of insects mostly do not have wings, but most adult forms of insects do have wings and thus attempt to fly away. However, these are easily entrapped on the transparent walls 7 of collecting cage 5, and can be readily seen due to the transparent nature of the plexiglass. Therefore, they can be efficiently collected by the vacuum system. Hence, flexible hose 4 is inserted into collecting chamber 5 by means of collar 8 which may be located on top 6 or any of sides 7. The instant invention was fitted on top 6 and the only limiting feature is that enough of flexible hose length 4 be provided inside collecting cage 5 to allow efficient working conditions to vacuum all sides, top, ground, and plants contained within. Sufficient length of flex hose 4 must also be provided on the outside between collecting cage 5 and collecting chamber 2 to allow for efficient movement during transport, and for comfortable working conditions.

Figure 2:
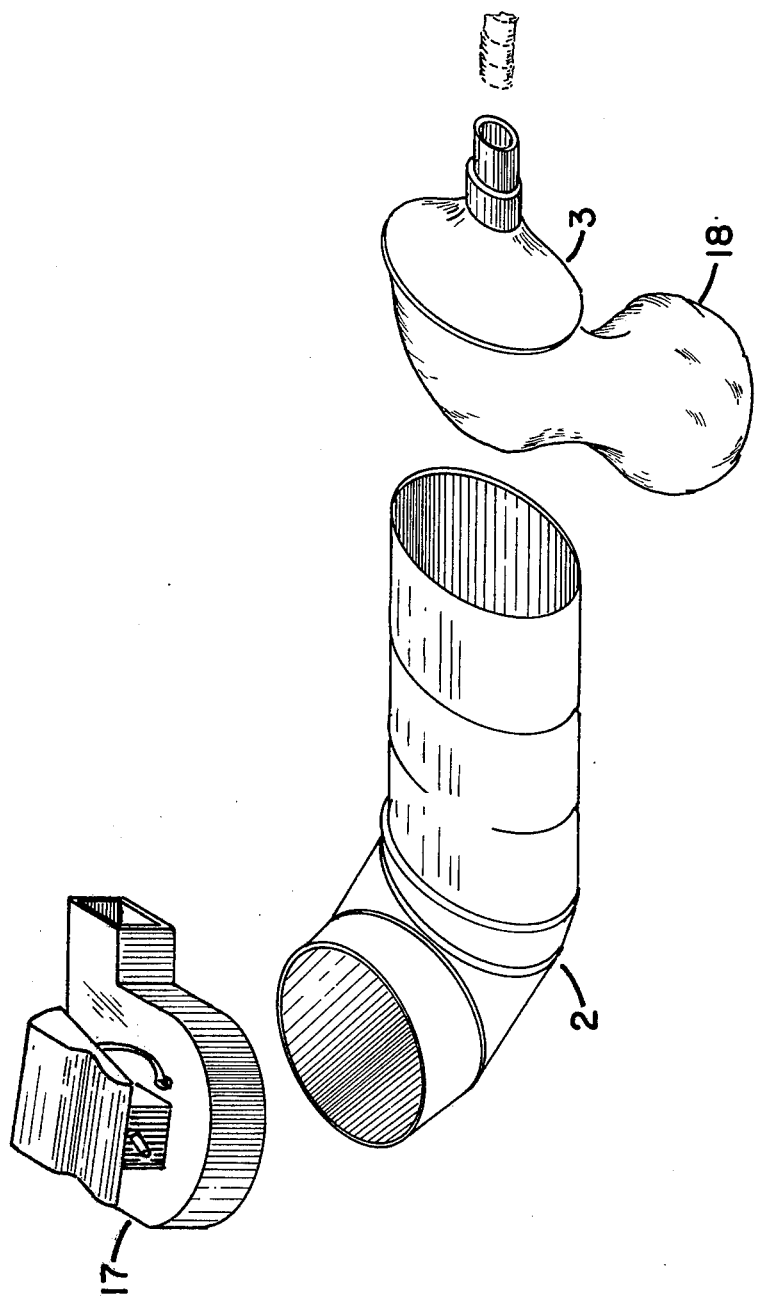
FIG. 2 is an exploded view of elements 1, 2 and 3 in FIG. 1.

Referring now to both FIGS. 1 and 2 wherein vacuum source 1 is affixed to collecting chamber 2 in an air-tight manner which in turn is affixed to distal end 3 in an air-tight manner which in turn is affixed to adapter system 11 in an air-tight manner, which in turn is affixed to flexible hose 4 in an air-tight manner. Vacuum source 1 (FIG. 3) may be any vacuum means but in the instant invention vacuum source 1 is comprised of a standard back pack 15, attached to a 3 horsepower gasoline motor 16, and a squirrle cage vacuum system 17. The gasoline motor 16 was used in field sampling to enable the invention to be portable. However, any workable vacuum system may be employed. Thus as insects are drawn through portable hose 4 FIGS. 1 and 2, they are collected in collecting bag 18 which is tightly fitted inside collecting chamber 2 and held in place by distal end 3. In the instant invention, a nylon chiffon collecting bag was employed to allow for collection of very small insects such as mites, thereby resulting in a more accurate population sampling. Nevertheless, collection bag 18 may be comprised of any material which will efficiently allow air to pass through but entrap insects of any size. Sides 7 of collecting cage 5 are fitted with arm holes 12 which are designed with elastic sleeves 19 to allow for manual entry of arms and hands into collecting cage 5. Thus the operator can manually vacuum the insects into the collecting bag without disturbing the snare. Elastic sleeves 19 hang limp when the arms of the operator are not inserted through thus plugging the holes and preventing the insects from escaping. Collecting cage 5 is fitted with horizontal handles 13 on any two opposite sides to allow for easily carrying in the field.

The instant invention was designed 3' × 3' × 3' high for working in cotton fields during the early growing season, but a device 3' × 3' × 6' high would be used when it is desirable to sample populations at a more mature stage of growth. The size of the sampler is limited only by the study to be made.

I claim:

1. In an apparatus for sampling arthropods in an agricultural environment wherein a vacuum device is employed to withdraw said arthropods from said environment through a hose on said device, and wherein said arthropods are captured in a filter bag on said device, the improvement comprising a rectangular, transparent, portable, arthropod-entrapment cage connected to said hose, wherein said hose extends into said cage a sufficient distance to reach all points on said cage's inner sides, top and bottom, and wherein said cage is bottomless to permit it to be placed over and completely around a plant specimen in said environment, and said cage's sides include openings for insertion of human hands and arms, said openings also including elastic sleeves to form a seal-tight enclosure around said arms, and to form a covering over said openings during nonuse of said openings.

* * * * *

UNITED STATES PATENT AND TRADEMARK OFFICE
CERTIFICATE OF CORRECTION

PATENT NO. : 4,141,174
DATED : February 27, 1979
INVENTOR(S) : James W. Smith

It is certified that error appears in the above-identified patent and that said Letters Patent are hereby corrected as shown below:

On the title page, item [75] should read

-- Inventor: James W. Smith, Leland, Miss. --.

Signed and Sealed this

Fifth Day of June 1979

[SEAL]

Attest:

RUTH C. MASON
Attesting Officer

DONALD W. BANNER
Commissioner of Patents and Trademarks